United States Patent
Liang

(10) Patent No.: US 7,181,073 B1
(45) Date of Patent: Feb. 20, 2007

(54) IMAGE CODING USING EMBEDDED ZEROTREE PATTERNS AND BITPLANES

(75) Inventor: Jie Liang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/517,234

(22) Filed: Mar. 2, 2000

Related U.S. Application Data

(60) Provisional application No. 60/123,330, filed on Mar. 8, 1999.

(51) Int. Cl.
*G06K 9/46* (2006.01)

(52) U.S. Cl. .................. 382/240; 382/232; 382/248

(58) Field of Classification Search ............... 382/236, 382/240, 244, 239, 251, 248, 232, 243, 233; 375/240.1, 240.19; 708/203; 348/405.1, 348/700
See application file for complete search history.

(56) References Cited

U.S. PATENT DOCUMENTS

| | | | | |
|---|---|---|---|---|
| 5,758,073 A | * | 5/1998 | Liang et al. ............. | 709/230 |
| 5,764,805 A | * | 6/1998 | Martucci et al. ............. | 382/238 |
| 5,764,807 A | * | 6/1998 | Pearlman et al. ............ | 382/240 |
| 5,847,616 A | * | 12/1998 | Ng et al. ....................... | 331/57 |
| 5,923,785 A | * | 7/1999 | Dube ........................ | 382/240 |
| 6,023,296 A | * | 2/2000 | Lee et al. .................... | 348/405 |
| 6,144,773 A | * | 11/2000 | Kolarov et al. ............. | 382/240 |
| 6,148,111 A | * | 11/2000 | Creusere ..................... | 382/240 |
| 6,160,846 A | * | 12/2000 | Chiang et al. ......... | 375/240.05 |
| 6,233,278 B1 | * | 5/2001 | Dieterich ............... | 375/240.03 |
| 6,269,192 B1 | * | 7/2001 | Sodagar et al. ............. | 382/240 |
| 6,356,665 B1 | * | 3/2002 | Lei et al. .................... | 382/240 |
| 6,359,928 B1 | * | 3/2002 | Wang et al. ........... | 375/240.05 |
| 6,381,280 B1 | * | 4/2002 | Lynch et al. ........... | 375/240.19 |
| 6,483,946 B1 | * | 11/2002 | Martucci et al. ............. | 382/240 |

FOREIGN PATENT DOCUMENTS

| | | | |
|---|---|---|---|
| WO | WO 97/32281 | * | 9/1997 |
| WO | WO 98/54675 | * | 12/1998 |

* cited by examiner

*Primary Examiner*—Anh Hong Do
(74) *Attorney, Agent, or Firm*—Carlton H. Hoel; W. James Brady; Frederick J. Telecky, Jr.

(57) ABSTRACT

An image coding method using wavelet decomposition and coding clusters of four-children coefficients bitplane-wise including value-bits for significance and refinement, and tree-bits for tree structure significance.

5 Claims, 2 Drawing Sheets

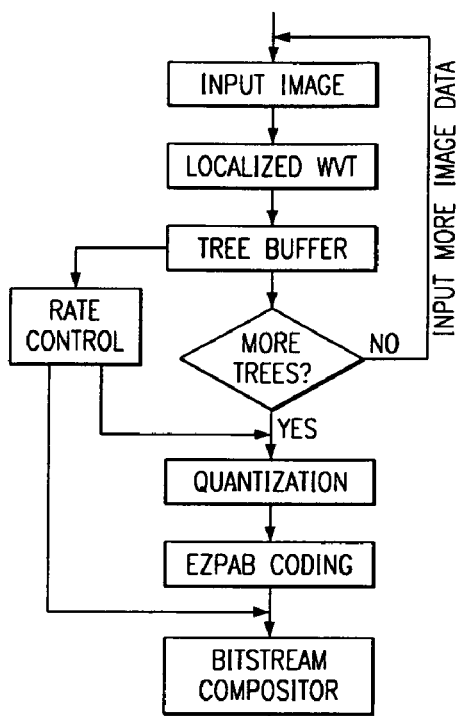
FIG. 1
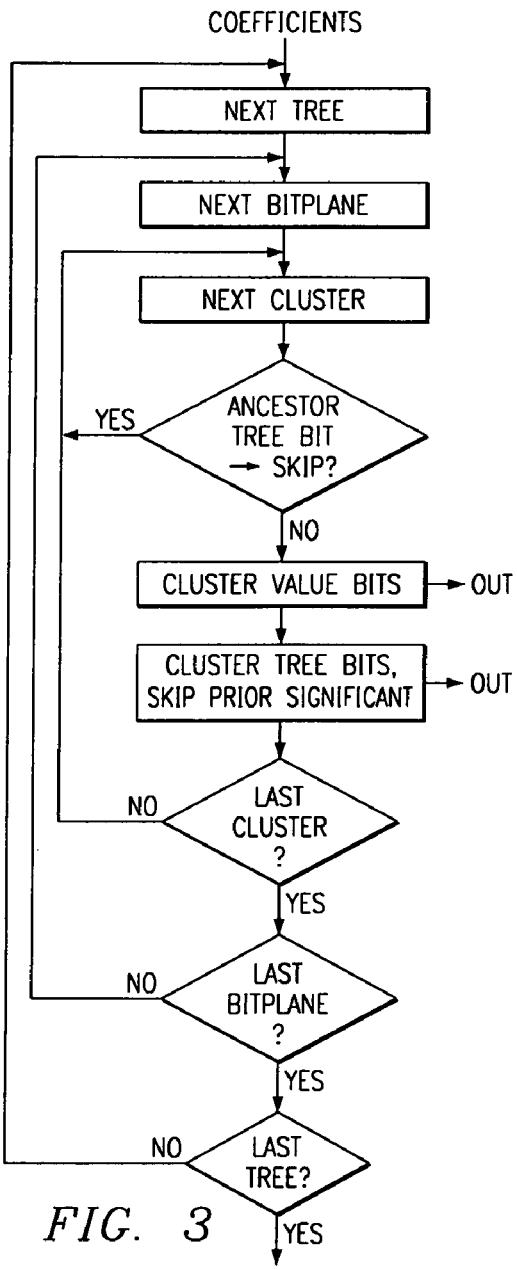
FIG. 3
| | | MSB | 2nd | 3rd | 4th | 5th | 6th |
|---|---|---|---|---|---|---|---|
| COARSEST LEVEL | VALUE | 0 | 1 ± | R | R | R | R |
| | TREE | 1 | 1 | 1 | 0 | SKIP | SKIP |
| SECOND LEVEL | VALUE | SKIP | SKIP | SKIP | 0 | 1 ± | R |
| | TREE | SKIP | SKIP | SKIP | 0 | SKIP | SKIP |
| THIRD LEVEL | VALUE | SKIP | SKIP | SKIP | 1 ± | R | R |
| | TREE | SKIP | SKIP | SKIP | 1 | 0 | SKIP |
FIG. 4

IMAGE CODING USING EMBEDDED ZEROTREE PATTERNS AND BITPLANES

CROSS-REFERENCE TO RELATED APPLICATIONS

This application claims priority from provisional patent application Ser. No. 60/123,330, filed Mar. 8, 1999. The following application discloses related subject matter: Ser. No. 09/164,517, file Sep. 30, 1998, now U.S. Pat. No. 6,956,973.

BACKGROUND OF THE INVENTION

The invention relates to digital image compression and coding and decoding.

For encoding and compressing a single frame as in JPEG or an I frame in MPEG, Shapiro, Embedded Image Coding Using Zerotrees of Wavelet Coefficients, 41 IEEE Tr.Sig. Proc. 3445 (1993) provides a wavelet hierarchical subband decomposition which groups wavelet coefficients at different scales and predicts zero coefficients across scales. This provides a quantization and fully embedded bitstream in the sense that the bitstream of a lower bitrate is embedded in the bitstream of higher bitrates. FIGS. 2a–2c illustrate a wavelet transform decomposition.

Coding efficiency is, by definition, important to any image compression method. However, increasingly, the features or properties of a coding method play an increasing role in determining the usefulness of the method in practice. Scalability is a very important feature for any image coding method in many applications such as digital photography, Internet, image database, etc. There are many aspects of the scalability property, which can be summarized as follows:

Quality scalability: the bitstream can be parsed (without complicated processing) into sub-bitstream that can be decoded to have different quality reconstruction of the original image. An important case is progressive quality scalability, which means that the bitstream can be decoded progressively, with reconstructed images getting increasingly better with more and more bits received.

Resolution scalability: the bitstream can be parsed into sub-bitstream that represents different resolution of the original image. Progressive resolution scalability is a special case.

Computational complexity scalability: this quality enables the application to adjust the encoding/decoding complexity easily and with minimal change to most of the coding modules.

It is often desirable that both quality and resolution scalability are present in the same bitstream, so that the decoder can choose the desirable resolution and the desirable rate according to its own constraints which can not be decided at the encoding time. Computational complexity scalability is mostly tied to the memory requirement and speed profile of the method. In many embedded systems, memory is a serious constraint, and speed of encoding/decoding is crucial (for instance, in digital still cameras, shot-to-shot delay is a crucial quality factor in evaluating cameras).

A good coding method should allow a good balance among all these requirements.

SUMMARY OF THE INVENTION

The invention provides a zerotree image coding method which splits the coding symbols into separate value bits and tree bits and codes in children node clusters. This embedded zerotree patterns and bitplanes (EZPAB) method utilizes zerotrees to encode large clusters of zero coefficients and bitplane coding to encode the amplitude of non-zero coefficients.

This has advantages over other wavelet coders (including other zerotree based image coders), in that the method is more scalable, not just in quality and spatial resolutions, but also in computational complexity. EZPAB allows for the optional use of no-entropy coding mode and context-based arithmetic coding mode, which gives a good tradeoff between computational complexity/power consumption and coding efficiency. At the meantime, it consumes minimal amount of memory, which size is independent of image sizes.

BRIEF DESCRIPTION OF THE DRAWINGS

FIG. 1 shows a preferred embodiment coding system.

FIG. 3 is a flow diagram.

FIG. 4 illustrates an example.

DESCRIPTION OF THE PREFERRED EMBODIMENTS

Overview

The preferred embodiment embedded zerotree pattern and bitplane (EZPAB) coding encodes the wavelet coefficients of an image bitplane-by-bitplane. At each location in the HH, LH, or HL subbands (other than at the finest decomposition level), there are two bits associated with that location in the bitplane: the bit that represents the value of the wavelet coefficient at that location (value-bit), and the bit that represents the significance of the quadtree (zerotree) that is rooted at that location (tree-bit). Encode the value-bit and tree-bit for all four neighbors that have the same parent, and go from one four-coefficient cluster to the next, from the coarsest decomposition level to the finest decomposition level, and from one tree-block to the next. The value-bits can be further classified as significance value-bit, sign value-bit, and refinement (of magnitude) value-bit. Following the scanning procedure, good coding efficiency can be achieved even without any use of entropy coding (that is, simply put the uncoded bits into the bitstream). Another option is to encode these value-bits and tree-bits with context-based arithmetic coding. The coding efficiency is about 10–15% better, and is competitive with the best coder known, with the advantages of less memory requirement and faster speed.

System

FIG. 1 illustrates the overall procedure of the EZPAB coder. The image can be input either in block-by-block mode or line-by-line mode. A localized wavelet transform is used to transform the image into wavelet coefficients. Then, the wavelet coefficients are organized into tree structure data, and stored in the tree buffer. Once a zerotree is ready, the system calls on the EZPAB coding module, and feeds the tree structured data to the EZPAB module. When no trees are left in the buffer, it sends a signal to the input module to input more image data (again in either block-by-block or line-by-line fashion). The core part of the coding system is the EZPAB coding module operating on a single full-depth zerotree. The next section shows in more detail the coding procedure for a single zerotree. The bits can be transmitted directly from the EZPAB coding module or can be first arithmetically encoded for transmission. The magnitude scale is deterined after all trees are encoded with a minimum quantization level and in a transmission buffer by simply deleting leading insignificant bitplanes.

EZPAB Coding on a Single Zerotree

Figure 2A:
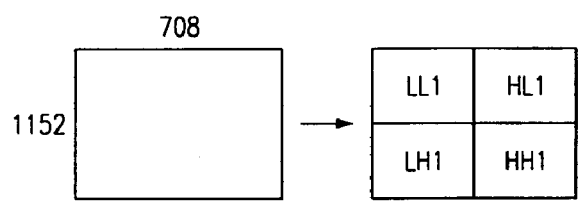
FIGS. 2a–2d illustrate wavelet decomposition and tree structure.
Figure 2B:
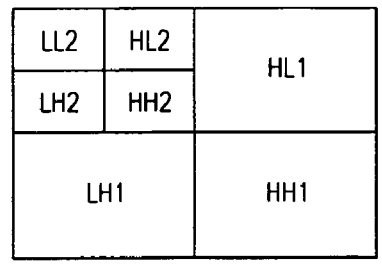
Figure 2C:
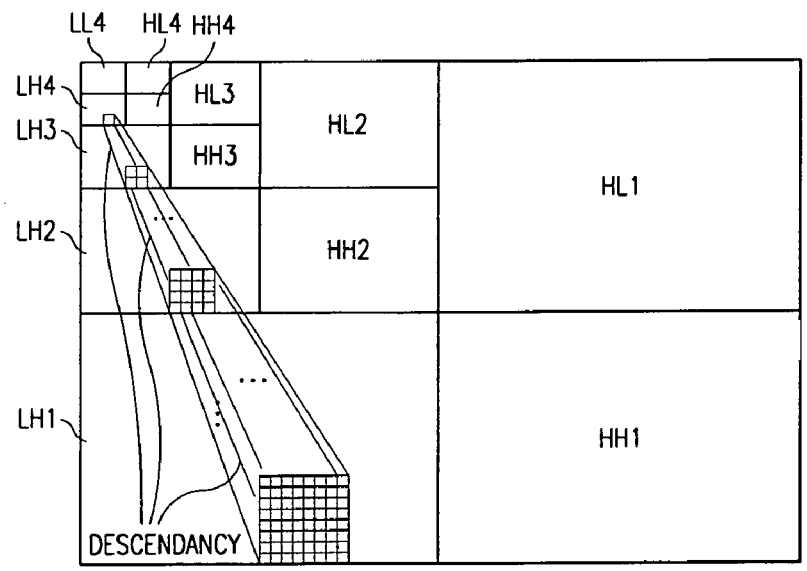
Figure 2D:
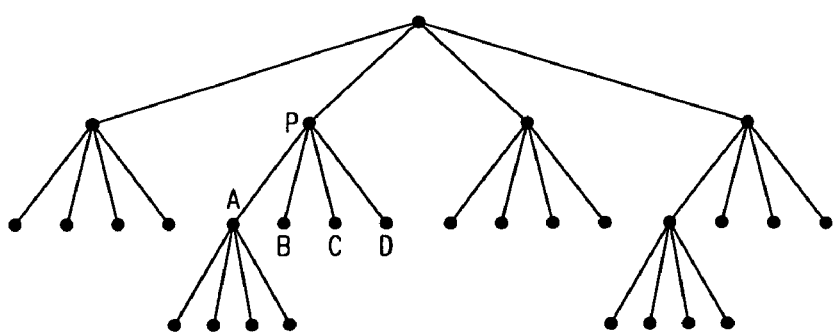

FIG. 2d shows the structure of a full-depth zerotree for the case of a four-level decomposition. Each non-leaf node (P) has four children nodes. These four-children-node clusters (A,B,C,D) are the basic coding units for EZPAB. Proceed from top level down, and from left to right. For each cluster, first encode their significance or magnitude refinement bits, followed by the tree-bits (except for the finest decomposition level) that indicate the significance of the zerotrees.

Coding of the Significance Bits S(A), S(B), S(C), and S(D)

For each four-children cluster that cannot derive its significance from the coding contexts (that is, they are not part of a zerotree that has already been found insignificant in the current bitplane), explicitly encode their significance.

Encode the significance bits from A to D, and skip any coefficients that have already been found significant. For those coefficients that have been found significant in previous bitplanes, send the refinement (of the magnitude) bits instead. For the newly significant coefficient, encode its sign bit.

The following is the pseudo-code that describes the procedure:

```
for (T in [A, B, C, D])
{
    if (T is already found significant)
        send/encode refinement bit;
        continue;
    if (T is not at the finest decomposition level, or, T is not at
    location D)
    {
        send/encode S(T), the significance bit of T;
        if (T is significant)
            send/encode sign bit of T;
    }
    else /* T is at the finest decomposition level and at location D */
    {
        if ( A, B, C) are all insignificant)
            T must be significant, no need to send any significance bit
            send/encode the sign bit of T
        else
            send/encode S(T)
            if (T is significant)
                send/encode the sign bit of T
    }
}
```

Note that nodes D in the finest decomposition level may be skipped when their codes are determined by prior codes, such as when the cluster is significant but nodes A,B, and C are insignificant.

After encoding the value-bits for A,B,C,D, we then encode the four tree-bits that are associated with the four locations. Notice that there is no need to encode tree-bits for the finest decomposition level because a leaf does not have any children. The following describes the procedure for encoding the tree-bits:

```
if (all A,B,C,D tree-bits are insignificant)
    send/encode one bit to indicate that all A,B,C,D are
        insignificant;
else
{
```

-continued

```
for (Tree rooted at [A, B, C, D])
{
    if (Tree is already found significant)
        continue;
    if (Tree is not at location D)
        send/encode the significance of Tree;
    else
        if (Trees at A,B,C are all insignificant)
            no need to send any bit, Tree at D must be significant
        else
            send/encode the significance bit
}
}
```

Note that again nodes D may be skipped when their codes are determined by prior codes, such as when the cluster has at least one significant tree bit but nodes A,B, and C have insignificant tree bits.

Also, in all of the above, only encode the tree-bits or value-bits for the four-neighbor clusters that are not part of a larger zerotree. Otherwise, their significance can be derived from the context of the process. FIG. 3 is a general flow diagram.

In both procedures, use a "send" or "encode" to indicate which of the two modes is enabled. For a very low-complexity mode, use send, which means that no entropy coding is done here, just put the bits into the bitstream. For a computational intensive mode, use encode which means a context-based arithmetic coding to encode the bits. For the value-bit, the context is determined by the number of significant coefficients in the same cluster as well as the location of the current coefficient (A,B,C or D), which is a total of 4×4=16 contexts. For the tree-bit, the context is determined by the number of significant trees in the same cluster and the significance of the coefficient at the same location, which is a total of 4×2=8 contexts.

Thus the foregoing provides a coding method that strikes a balance among all the different features. This enables a mode that requires no arithmetic or Huffman coding. The bits that represent zerotree patterns, coefficient signs, and magnitude bits are directly output to the final bitstream. On the other hand, without any change to the coding procedures (the same transform, coefficient scanning, zerotree forming procedures), one can encode those same bits with context-based arithmetic coding. All features and memory requirement remain the same between these two modes, but significant speed up can be achieved with the elimination of arithmetic coding and context forming.

FIG. 4 illustrates an example of the coding. In particular, FIG. 4 represents the coding of the four nodes in a vertical slice through a full-depth tree; the columns represent the bitplanes with most significant bit to the left and the rows represent the value and tree bits from coarsest to finest decomposition level with the coarsest at the top. Thus the coding proceeds from top to bottom through a tree and proceeds left to right through the bitplanes. At the top of the first column the 0 indicates an insignificant value at the coarsest level in the most significant bitplane. The 1 below this 0 indicates that this coarsest level node is the root of a zerotree (that is, in the most significant bitplane all of the descendant (children) nodes of this full-depth tree are insignificant). Because all children node coefficients are insignificant, they are skipped in the coding as indicated by the remainder of the first column.

The top entry 1 of the second column indicates the coarsest level node is significant in the second most significant bitplane (that is, the value of the corresponding coefficient has its first nonzero bit in this bitplane) and the ± indicates a second value bit is used to indicate the sign of the coefficient. The 1 in the second row indicates that all of the children are still insignificant and are skipped.

The top entry of the third column indicates the second (refinement) bit of the binary expansion of the coefficient at the coarsest level node. Again, the 1 in the second row indicates a zerotree so the children are again skipped.

The top entry of the fourth column indicates the third (refinement) bit of the coefficient at the coarsest level node. The 0 in the second row indicates that at least one of the children nodes has a significant coefficient in the fourth bitplane. Thus the cluster of four children at the second level have their value bits and then their tree bits encoded. For the second-level child node (of the cluster) in the third row the value bit 0 indicates that the coefficient is still insignificant in the this (fourth) bitplane but the tree bit 0 indicates than at least one descendant in either the third or fourth level is significant. The 1 in the fifth row indicates that this third-level child node coefficient has its leading nonzero bit in this bitplane and the ± again indicates the sign; the other three nodes in its cluster have their value bits encoded at this time. The 1 in the sixth row indicates that this third-level child is the root of a zerotree, so its four children are skipped. The other three nodes in its cluster have their tree bits encoded at this time.

The fifth column (bitplane) has from top to bottom: the fourth (refinement) bit for the coarsest level node coefficient, the second row skip of the tree bit because the tree was already found significant in the fourth column. The third row 1 and ± are two bits that indicate this second-level child's coefficient has its first significant (nonzero) bit in this bitplane and its sign. The fourth row tree bit is skipped because the tree was already found significant in the fourth bitplane. The fifth row is the second (refinement) bit for the third-level child's coefficient, and the sixth row 0 indicates that at least one fourth-level child is significant in this bitplane. The seventh row 1 and ± are two bits that indicate this fourth-level child's coefficient has its first significant (nonzero) bit in this bitplane and its sign. The sixth column (bitplane) shows value bits as refinement bits and skips tree bits because of previous tree significance.

Decoding

The decoding of the bitstream just interprets the bits according to the EZPAB coding to recover the wavelet coefficients (to whatever number of refinement bits usable) and then performs an inverse wavelet transformation to recover the image. Of course, error correction and other channel coding may be imposed for transmission or storage.

Experimental Results

In this section, we provide the coding results using the proposed method. We use both options of the EZPAB coder: option A—no entropy coding, and option B—using arithmetic coding. We choose the commonly used image Lena (512×512). The results include all overhead, including the 4 bytes resynchronization marker for each subband at each bitplane (a significant overhead, but necessary for good error resilience properties).

TABLE 1

Coding Results

| EZPAB Option A (no entropy coding) | | EZPAB Option B (with arithmetic coding) | |
| --- | --- | --- | --- |
| Bitrate (bit/pixel) | PSNR (db) | Bitrate (bit/pixel) | PSNR (db) |
| 2.004 | 45.294 | 2.193 | 45.294 |
| 0.998 | 40.337 | 1.098 | 40.337 |
| 0.478 | 36.931 | 0.526 | 36.931 |
| 0.251 | 34.003 | 0.284 | 34.003 |
| 0.125 | 30.882 | 0.124 | 30.032 |

What is claimed is:

1. A method of image coding, comprising:
   (a) wavelet transform a portion of a digital image into hierarchical trees of coefficients;
   (b) for a first tree of said hierarchical trees and for a first cluster of children nodes derived from a first parent node of said first tree, after encoding said first parent node encode a value and tree indication for each of the children nodes in said first cluster wherein (i) said value and tree indication are skipped when said encoding of said first parent node so indicates, (ii) said tree indication for a first of said children nodes indicates significance of descendant nodes of said first of said children nodes, (iii) said value for a first of said children nodes indicates significance of said first of said children nodes, (iv) said value and tree indication for one of said children nodes is skipped when determinable from encoding of the other of said children nodes of said first cluster, and (v) said tree indication is omitted if said children nodes in said first cluster have no descendant nodes; and
   (c) repeat foregoing step (b) for a second, third, . . . , and Nth cluster of children nodes derived from a second, third, . . . , and Nth parent node of said first tree; and
   (d) repeat foregoing steps (b)–(c) for a second, third, . . . , and Mth tree of said hierarchical trees.

2. The method of claim 1, wherein:
   (a) the steps (b)–(c) of claim 1 are repeated for each bitplane of said coefficients.

3. The method of claim 1, wherein:
   (a) the steps (b)–(c) of claim 1 include arithmetic coding of said values and tree indications using a context which for a children node includes other children nodes of a common cluster.

4. The method of claim 2, wherein:
   (a) said value is a member of the group consisting of a significance bit plus a sign bit, an insignificance bit, a refinement bit, and a skip.

5. The method of claim 2, wherein:
   (a) said tree indication is a member of the group consisting of a zerotree root, a significant descendant node, and a skip.

* * * * *